United States Patent
Kues et al.

(10) Patent No.: US 9,017,819 B2
(45) Date of Patent: Apr. 28, 2015

(54) PLASTIC SUBSTRATES HAVING A SCRATCH-RESISTANT COATING, IN PARTICULAR HOUSINGS OF ELECTRONIC DEVICES, HAVING HIGH TRANSPARENCY, METHOD FOR THE PRODUCTION THEREOF, AND USE THEREOF

(75) Inventors: Jan Bernd Kues, Muenster (DE); Andre Brosseit, Hamm (DE); Karin Homann, Steinfurt (DE); Stefanie Schroeder, Duelmen (DE)

(73) Assignee: BASF Coatings GmbH, Munster (DE)

( * ) Notice: Subject to any disclaimer, the term of this patent is extended or adjusted under 35 U.S.C. 154(b) by 134 days.

(21) Appl. No.: 13/577,100

(22) PCT Filed: Oct. 2, 2010

(86) PCT No.: PCT/EP2010/006028
§ 371 (c)(1),
(2), (4) Date: Sep. 11, 2012

(87) PCT Pub. No.: WO2011/095186
PCT Pub. Date: Aug. 11, 2011

(65) Prior Publication Data
US 2013/0202892 A1 Aug. 8, 2013

(30) Foreign Application Priority Data
Feb. 4, 2010 (DE) .......... 10 2010 006 755

(51) Int. Cl.
C09D 175/16 (2006.01)
C09D 133/14 (2006.01)
C08K 3/36 (2006.01)
B32B 27/40 (2006.01)
C08G 18/79 (2006.01)
C08G 18/81 (2006.01)
C08L 33/14 (2006.01)
C08L 75/14 (2006.01)
C09D 4/00 (2006.01)
C09D 175/14 (2006.01)

(52) U.S. Cl.
CPC ............ C09D 133/14 (2013.01); C08G 18/792 (2013.01); C08G 18/8175 (2013.01); C08K 3/36 (2013.01); C08L 33/14 (2013.01); C08L 75/14 (2013.01); C09D 4/00 (2013.01); C09D 175/14 (2013.01); C09D 175/16 (2013.01)

(58) Field of Classification Search
USPC ............ 428/424.2, 412, 446, 423.1; 427/164; 524/560, 850
See application file for complete search history.

(56) References Cited

U.S. PATENT DOCUMENTS

| 3,022,272 | A | 2/1962 | Schnell et al. |
| 4,382,102 | A * | 5/1983 | Noomen .................. 427/517 |
| 4,455,205 | A | 6/1984 | Olson et al. |
| 5,340,905 | A | 8/1994 | Kuhling et al. |
| 6,232,360 | B1 | 5/2001 | Meixner et al. |
| 6,420,451 | B1 | 7/2002 | Lin et al. |
| 7,608,306 | B2 * | 10/2009 | Hasskerl et al. ............ 427/487 |
| 2002/0111390 | A1 | 8/2002 | Lin et al. |
| 2008/0254229 | A1 * | 10/2008 | Lake ........................ 427/508 |

FOREIGN PATENT DOCUMENTS

| DE | 1031512 A | 6/1958 |
| EP | 0668330 B1 | 12/1997 |
| EP | 1704189 B1 | 9/2006 |
| JP | 2007084598 A | 4/2007 |
| WO | WO2009049000 A1 | 4/2009 |

OTHER PUBLICATIONS

English Translation of International Preliminary Report on Patentability for International Application No. PCT/EP2010/006028 mailed Aug. 16, 2012, 6 pages.
Conference report "RadTech 2000" of Apr. 9-12, 2000, Baltimore, pp. 822-831.
Machine Translation of DE1031512 published Jun. 4, 1958, 5 pages.
English Translation International Search Report for International Application No. PCT/EP2010/006028 mailed Nov. 30, 2010, 2 pages.
Written Opinion of the International Searching Authority for International Application No. PCT/EP2010/006028 mailed Nov. 30, 2010, 4 pages.

* cited by examiner

*Primary Examiner* — Thao T. Tran
(74) *Attorney, Agent, or Firm* — Cantor Colburn LLP

(57) ABSTRACT

The disclosed method comprises applying a transparent coating composition to a plastics substrate, the composition comprising
30% to 60% by weight of a nanoparticles (B), 15% to 40% by weight, of urethane (meth)acrylates (A1) having 3 to 5 (meth)/acrylate groups per molecule, 0% to less than 10% by weight of urethane (meth)acrylates (A2) having more than 5 (meth)/acrylate groups per molecule, 0% to less than 10% by weight of urethane (meth)acrylates (A3) having less than 3 (meth)/acrylate groups per molecule, 55% to 80% by weight of compounds (C1) having 4 (meth)/acrylate groups per molecule, 0% to 15% by weight of compounds (C2) having 2 (meth)/acrylate groups per molecule, and 0% to 15% by weight of compounds (C3) having 3 (meth)/acrylate groups per molecule, the sum of the weight fractions of film-forming components (A1), (A2), (A3), (C1), (C2), and (C3) being in each case 100% by weight.

15 Claims, No Drawings

PLASTIC SUBSTRATES HAVING A SCRATCH-RESISTANT COATING, IN PARTICULAR HOUSINGS OF ELECTRONIC DEVICES, HAVING HIGH TRANSPARENCY, METHOD FOR THE PRODUCTION THEREOF, AND USE THEREOF

CROSS REFERENCE TO RELATED APPLICATIONS

This application is a National Phase Application of Patent Application PCT/EP2010/006028 filed on 2 Oct. 2010, which claims priority to DE 10 2010 006 755.5, filed 4 Feb. 2010.

FIELD OF THE INVENTION

The present invention relates to a method of coating plastics substrates, more particularly casings of electronic appliances, by applying a transparent coating composition comprising at least one radiation-curable urethane (meth)acrylate (A), nanoparticles (B), reactive diluents (C), and, optionally, solvents, to the plastics substrate, and to the coated substrates obtainable by the method.

BACKGROUND OF THE INVENTION

WO 09/049,000 has already disclosed a method of the type specified above, that uses radiation-curable coating compositions which, in addition to >10% to <40% by weight of nanoparticles (B), based on the total weight of the film-forming constituents (A) and (C), comprise 10% to 60% by weight of at least one binder (A) and 40% to 90% by weight of at least one reactive diluent (C), the sum of the weight fractions of the film-forming constituents (A) and (C) being in each case 100% by weight. The resulting coatings feature good abrasion resistance and very good optical properties, i.e., a low haze value for the unexposed coating of less than 1. These qualities are assured by WO 09/049,000 by using urethane (meth)acrylates having two double bonds per molecule as binder (A) and high-functionality reactive diluents having preferably 3 to 6 double bonds per molecule as reactive diluent (C). If, in contrast, hexafunctional urethane (meth)acrylates and difunctional reactive diluents, such as hexanediol diacrylate, or only trifunctional and pentafunctional reactive diluents, are used, then the very low haze values required are not attained.

Moreover, EP-B-1 704 189 discloses radiation-curable coating compositions for coating plastics substrates, more particularly polycarbonate substrates, said compositions, in addition to nanoparticles (B), comprising at least two different polyfunctional (meth)acrylate-functional compounds, more particularly a mixture of a hexafunctional urethane acrylate and at least one compound selected from the group consisting of butanediol diacrylate, trimethylolpropane triacrylate, and pentaerythritolyl triacrylate. This combination of two different polyfunctional (meth)acrylate-functional compounds enhances the abrasion resistance of the resulting cured coating by comparison with cured coatings based only in each case on one polyfunctional (meth)acrylate-functional compound. That specification, however, does not give any information on the optical properties of the resulting coatings or on the effect of the film-forming components on the optical properties.

Also known, furthermore, from the conference report "RadTech 2000" of Apr. 9-12, 2000, Baltimore, pages 822-831, radiation-curable coating compositions for coating plastics substrates, more particularly polycarbonate substrates, said compositions, in addition to nanoparticles (B), comprising at least two different polyfunctional (meth)acrylate-functional compounds, more particularly a mixture of a hexafunctional urethane acrylate and at least one compound selected from the group consisting of hexanediol diacrylate, tripropylene glycol diacrylate, and ethoxylated trimethylolpropane triacrylate.

Disclosed, furthermore, by U.S. Pat. No. 6,420,451 are radiation-curable coating compositions, intended more particularly for the coating of spectacle lenses, that comprise (a) 20% to 80% of a first aliphatic urethane acrylate, more particularly a urethane acrylate having on average 2 double bonds per molecule, (b) 5% to 50% of a compound having one acrylate group per molecule, (c) (i) 2% to 30% of a second aliphatic urethane acrylate, more particularly a urethane acrylate having on average 6 double bonds per molecule, or (ii) 2% to 25% of a polyfunctional acrylate compound, or (iii) a combination of (i) and (ii), and (d) 1% to 30% of nanoparticles.

EP-B-668 330 describes radiation-curable coating compositions intended for the coating of polycarbonate substrates and comprising 20% to 75% by weight of at least one substantially hydroxyl-free and isocyanate-group-free aliphatic urethane acrylate (A) based on low-viscosity polyisocyanates containing isocyanurate groups, 5% to 80% by weight of a low-viscosity acrylic ester component (C), composed to an extent of at least 80% by weight of a bis-functional acrylic ester component and to an extent of up to 20% by weight of another acrylic ester component, and 0% to 80% by weight of a solvent or solvent mixture, the weight percentage figures for components (A), (C), and (LM) (solvent) being based in each case on the total weight of components (A), (C), and (LM). That specification, however, does not describe the addition of nanoparticles to the coating materials. Nor does it provide any information on the optical properties of the resulting coatings or on the effect of the film-forming components on the is optical properties.

Finally, U.S. Pat. No. 4,455,205 discloses radiation-curable coating compositions which comprise at least two different polyfunctional (meth)acrylate-functional compounds, more particularly a mixture of hexanediol diacrylate and trimethylolpropane triacrylate, and the hydrolysis product of silyl-functional acrylates and colloidal silicon dioxide. The use of urethane (meth)acrylates in the coating compositions, however, is not described.

The problem on which the present invention is based, then, was that of providing a method of coating plastics substrates, more particularly casings of electronic appliances, which endows the resulting coated substrates with a combination of very high scratch resistance with very high transparency and low gray haze (haze values for the unexposed coating of less than 1, preferably less than 0.8, in each case as determined using the BYK-Gardner Haze-gard plus C4725 instrument).

Furthermore, the coating compositions, following application to the plastics substrates, more particularly to polymethyl methacrylates, polycarbonates and/or blends of polycarbonate and other plastics, ought not to lead to any incipient swelling of the substrates.

Moreover, the coating compositions ought to result in cured coatings having very good adhesion (more particularly as determined using tape pull-off in accordance with ASTM D 3359 and ISO 2409) on plastics, more particularly on polymethyl methacrylates, polycarbonates and/or blends of polycarbonate and other plastics.

Lastly, the cured coatings ought to exhibit a high level of resistance on impact deformation (impact test) as determined in a method based on the standard DIN EN ISO 6272-1 DE.

SUMMARY OF THE INVENTION

In the light of the problem stated above, a method has been found of coating plastics substrates, by applying a transparent coating composition comprising at least one radiation-curable urethane (meth)acrylate (A), nanoparticles (B), reactive diluents (C), and, optionally, solvents to the plastics substrate, said method being one wherein the coating composition comprises (i) 30% to 60% by weight, based on the total weight of components (A1), (A2), (A3), (B), (C1), (C2), and (C3), of the nanoparticles (B),
(ii) 15% to 40% by weight, based on the total weight of film-forming components (A1), (A2), (A3), (C1), (C2), and (C3), of one or more urethane (meth)acrylates (A1) having on average 3 to 5 acrylate and/or methacrylate groups per molecule,
(iii) 0% to less than 10% by weight, based on the total weight of film-forming components (A1), (A2), (A3), (C1), (C2), and (C3), of one or more urethane (meth)acrylates (A2) having on average more than 5 acrylate and/or methacrylate groups per molecule,
(iv) 0% to less than 10% by weight, based on the total weight of film-forming components (A1), (A2), (A3), (C1), (C2), and (C3), of one or more urethane (meth)acrylates (A3) having on average less than 3 acrylate and/or methacrylate groups per molecule,
(v) 55% to 80% by weight, based on the total weight of film-forming components (A1), (A2), (A3), (C1), (C2), and (C3), of one or more monomeric and/or oligomeric compounds (C1), different from components (A1), (A2), and (A3), and having 4 acrylate and/or methacrylate groups per molecule,
(vi) 0% to 15% by weight, based on the total weight of film-forming components (A1), (A2), (A3), (C1), (C2), and (C3), of one or more is monomeric and/or oligomeric compounds (C2), different from components (A1), (A2), and (A3), and having 2 acrylate and/or methacrylate groups per molecule, and
(vii) 0% to 15% by weight, based on the total weight of film-forming components (A1), (A2), (A3), (C1), (C2), and (C3), of one or more monomeric and/or oligomeric compounds (C3), different from components (A1), (A2), and (A3), and having 3 acrylate and/or methacrylate groups per molecule, the sum of the weight fractions of film-forming components (A1), (A2), (A3), (C1), (C2), and (C3) being in each case 100% by weight.

The present invention further provides the coated polycarbonate substrates obtainable by the method, and their use.

In light of the prior art it was surprising, and unforeseeable for the skilled person, that the problems on which the present invention was based might be solvable using the method of the invention.

Hence it is surprising in particular that the inventively employed combination of specific urethane acrylates with tetrafunctional (meth)acrylic esters, in combination if desired with difunctional (meth)acrylic esters and/or trifunctional (meth)acrylic esters, produces coatings combining a very high scratch resistance with very high transparency and low gray haze (haze values for the unexposed coating of less than 1, preferably less than 0.8, in each case as determined using the BYK Gardner haze-gard plus C4725 instrument).

Furthermore, following application to the plastics substrates, more particularly to polymethyl methacrylates, polycarbonates and/or blends of polycarbonate and other plastics, the coating compositions do not cause any incipient swelling of the substrates.

Furthermore, the coating compositions result in cured coatings having very good adhesion (more particularly as determined by tape pull-off in accordance with ASTM D 3359 and ISO 2409) to plastics, more particularly to polymethyl methacrylates, polycarbonates and/or blends of polycarbonate and other plastics.

Lastly, the cured coatings exhibit high resistance under impact deformation (impact test), as determined by a method based on the standard DIN EN ISO 6272-1 DE.

DETAILED DESCRIPTION OF AN EMBODIMENT OF THE INVENTION

Inventively Employed Coating Composition
The Radiation-Curable Binder (A)

It is essential to the invention that the coating compositions used in the method of the invention comprise as radiation-curable binder (A) one or more urethane (meth)acrylates (A1) having on average 3 to 5 acrylate and/or methacrylate groups per molecule, in combination if desired with urethane acrylates (A2) having on average more than 5 acrylate and/or methacrylate groups per molecule and/or with urethane acrylates (A3) having on average less than 3 acrylate and/or methacrylate groups per molecule. As a result of this specific selection of the radiation-curable binders in combination with the tetrafunctional (meth)acrylic esters (C1), in combination if desired with difunctional (meth)acrylic esters (C2) and/or trifunctional (meth)acrylic esters (C3), coatings are obtained which have very high scratch resistance in conjunction with very high transparency and low gray haze (haze values for the unexposed coating of less than 1, preferably less than 0.8, in each case as determined using the BYK-Gardner Haze-gard plus C4725 instrument).

As radiation-curable binder (A) it is preferred to use one or more urethane (meth)acrylates (A1) having on average 3 to 4 acrylate and/or methacrylate groups per molecule.

In principle, all urethane (meth)acrylates (A1) having the required number of acrylate and/or methacrylate groups are suitable. Whereas acrylate groups are preferred groups for UV-curing systems, methacrylates are frequently cured using electron beams. However, urethane (meth)acrylates with both acrylate and methacrylate groups can also be used.

As radiation-curable binder (A) it is preferred to use one or more urethane acrylates (A1) having on average 3 to 5, more particularly 3 to 4, acrylate groups per molecule. More particularly, aliphatic urethane acrylates (A1) are used.

The urethane (meth)acrylates used as component (A1) may be prepared, in a way which is known to the skilled person, by reacting (a1) hydroxyalkyl acrylates and/or hydroxyalkyl methacrylates, preferably hydroxyalkyl acrylates and/or hydroxyalkyl methacrylates having 2 to 4 C atoms in the alkyl radical, in a blend if desired with 0 to 50 hydroxy equivalent %, preferably with 0 to 30 hydroxy equivalent %, based in each case on the total amount of component (a1), of other hydroxy-containing compounds
with
(a2) one or more polyisocyanates having on average at least 3 isocyanate groups per molecule.

The hydroxyalkyl acrylates and/or hydroxyalkyl methacrylates of component (a1) are known hydroxyalkyl esters of acrylic and methacrylic acid. It is preferred to use hydroxyalkyl acrylates and/or hydroxyalkyl methacrylates having 2 to 4 C atoms in the alkyl radical, such as, for example, hydroxyethyl methacrylate, hydroxyethyl acrylate, hydroxypropyl acrylate, hydroxypropyl methacrylate, hydroxybutyl acrylate, and hydroxybutyl methacrylate, with preference being given to the use of hydroxyethyl acrylate.

Together with the hydroxyalkyl acrylates and/or hydroxyalkyl methacrylates it is possible if desired for other hydroxyl-containing compounds as well to be used, although preferably only hydroxyalkyl acrylates and/or hydroxyalkyl methacrylates are used as component (a1).

Suitable other hydroxyl-containing compounds are, more particularly, monohydric to trihydric aliphatic alcohols of low molecular mass, preferably having 1 to 20 C atoms, such as, for example, methanol, ethanol, n-hexanol, isooctanol, isododecanol, benzyl alcohol, ethylene glycol, diethylene glycol, propylene glycol, glycerol, or alcohols obtained from these alcohols by alkoxylation.

Component (a2) constitutes one or more polyisocyanates having on average at least 3 isocyanate groups per molecule, more particularly aliphatic polyisocyanates having on average at least 3 isocyanate groups per molecule. It is preferred to use aliphatic polyisocyanates having on average 3 to 4 isocyanate groups per molecule.

Particular preference is given to using as component (A1) aliphatic urethane acrylates based on isocyanurates of aliphatic diisocyanates, very preferably aliphatic urethane acrylates based on isocyanurates of hexamethylene diisocyanate. These urethane acrylates are typically obtainable by reaction of component (a1) with isocyanurates of aliphatic diisocyanates as component (a2), more particularly with the isocyanurate of hexamethylene diisocyanate as component (a2).

The urethane (meth)acrylates (A1) are generally prepared by reacting components (a1) and (a2) by known methods, optionally with accompanying use of suitable urethanization catalysts. In this case it is preferred to react components (a1) and (a2) at an NCO/OH equivalents ratio of 0.9:1 to 1.1:1, preferably of around 1:1. Doing so means the resulting urethane (meth)acrylates have essentially no longer any free hydroxyl groups and essentially no longer any free isocyanate groups.

Suitable catalysts for the reaction are, for example, tin(II) octoate, dibutyltin dilaurate or tertiary amines, such as dimethylbenzylamine. The reaction may take place in bulk or else in the presence of reactive diluents (C1), (C2) and/or (C3) or in the presence of solvent (LM), provided these components have no hydrogen atoms that are reactive with isocyanate groups.

As aliphatic urethane (meth)acrylate (A1) it is also possible, for example, to use the commercially available products Sartomer CN 925 (aliphatic urethane tetraacrylate) and Sartomer CN 9276 (aliphatic urethane tetraacrylate) from Sartomer, and also the aliphatic urethane acrylate Desmolux® VP LS 2308 from Bayer Material Science.

As component (A1) it is also possible more particularly to use the to urethane acrylate described in EP-B-668 330 at page 2 line 41 to page 3 line 49 and the urethane acrylate described in example 1 of EP-B-668 330. One such preferably used urethane acrylate, for example, is the commercially available urethane acrylate Desmolux® VP LS 2308 by Bayer Material Science.

If desired it is possible, together with the urethane (meth) acrylate (A1), to use small amounts, of in each case less than 10% by weight, based on the total weight of the film-forming components, of one or more urethane (meth)acrylates (A3) having on average less than 3 acrylate and/or methacrylate groups per molecule, and/or one or more urethane (meth) acrylates (A2) having on average more than 5 acrylate and/or methacrylate groups per molecule. It is, however, particularly preferred, as radiation-curable binder (A), to use exclusively one or more urethane (meth)acrylates (A1) having on average 3 to 5 acrylate and/or methacrylate groups per molecule.

The urethane (meth)acrylates used as components (A2) and (A3) can be prepared, as for the urethane (meth)acrylates (A1), in a way which is known to the skilled person, by reacting hydroxyalkyl acrylates and/or hydroxyalkyl methacrylates, preferably hydroxyalkyl acrylates and/or hydroxyalkyl methacrylates having 2 to 4 C atoms in the alkyl radical, in a blend if desired with other hydroxyl-containing compounds, with one or more polyisocyanates having on average at least 2 isocyanate groups per molecule. As components (A2) and/or (A3) it is preferred to use aliphatic urethane acrylates.

The Nanoparticles (B)

Particularly suitable nanoparticles (B) are oxidic inorganic nanoparticles with an average particle size of 1 to 500 nm, preferably 3 to 100 nm, more preferably 5 to 50 nm, and very preferably 5 to 30 nm. Naturally, however, nanoparticles possess an average particle size in the nanometer range, and as such are delimited from particles with an average size in the micrometer range (for example, 1 μm and more). The term "oxidic inorganic" means that the nanoparticles in question are substantially those composed of a metal oxide, such as aluminum oxide, or a semimetal oxide, such as silicon dioxide. Latter nanoparticles may be obtained, for example, from aqueous alkali metal silicate solutions by acidification and subsequently drying. It is also possible to use what are called fumed silicas, obtained by flame hydrolysis of silicon-halogen compounds. A further possibility is to carry out hydrolysis and condensation of organofunctional silanes, to form aqueous or aqueous-alcoholic silica sols. The water present in these sols may be removed by means, for example, of azeotropic distillation. The average particle size is determined preferably by means of dynamic light scattering measurements (ALV goniometer, measurement angle 90°, temperature 23° C.), the results being evaluated by the cumulant method.

Particular preference, however, is given to nanoparticles whose surface has been modified with partially condensed compounds. Surface modification is typically accomplished by attachment of the groups located on the nanoparticle surface, such as hydroxyl groups, for example, to monomeric or oligomeric compounds. These monomeric or oligomeric compounds consequently contain at least one group with affinity for the groups located on the nanoparticle surface. Attachment may take place, for example, by covalent bonding, ionic attachment or physisorption. The fraction of the monomeric or oligomeric compounds that is not needed for attachment to the nanoparticle surface protrudes preferably wholly or partly into the medium surrounding the nanoparticles, and contributes preferably to improving the compatibility between nanoparticles, on the one hand, and the components (A) and/or (C), on the other. Nanoparticles of this kind are used with preference.

The monomeric or oligomeric compounds used for surface modification may, in addition to the group needed for attachment to the surface of the nanoparticles, comprise other functional groups, which are capable, for example, of reacting with the binder component (A). A surface modification of this kind is accomplished, for example, by addition of hydrolyzable silanes which carry ethylenically unsaturated groups to the oxidic nanoparticles, preferably silicas or $SiO_2$ sols or $SiO_2$ sol gels.

The surface modification of oxidic inorganic silica nanoparticles can be accomplished by partially condensing the silanes onto the nanoparticle surface. In this case the nanoparticles may be prepared, starting from an alkali metal silicate solution, by inducing the condensation of the solution under the influence of an acidic ion exchanger or of an acid, until the desired particle size is reached, and then, if desired following stabilization of the particles, by addition of the silanes, whereupon these silanes undergo (partial) hydrolysis and condensation onto the surface of the particles. If desired, the aqueous constituents are removed from the resulting sol under reduced pressure, by (azeotropic) distillation.

Surface-modified silica nanoparticles are available commercially, for example, from Byk, under the Nanobyk name, or from Nano Resins AG of Geesthacht, Germany, under the Nanopol® name.

The nanoparticles (B) are used, preferably in dispersion in solvents.

The Reactive Diluent (C) Used

It is essential to the invention that the coating composition used in the method comprise as reactive diluents (C1) one or more monomeric and/or oligomeric compounds (C1) which are different from component (A) and have 4 acrylate and/or methacrylate groups per molecule. Used more particularly as component (C1) are the esters of acrylic and/or methacrylic acid, preferably esters of acrylic acid, with tetrafunctional alcohols.

Examples of suitable reactive diluents (C1) are pentaerythrityl tetraacrylate, ditrimethylolpropane tetraacrylate, ethoxylated pentaerythrityl tetraacrylate, propoxylated pentaerythrityl tetraacrylate, and mixtures of the stated tetrafunctional reactive diluents. As component (C1) it is preferred to use pentaerythrityl tetraacrylate and/or ditrimethylolpropane tetraacrylate.

Use is made as reactive diluents (C2) of one or more monomeric and/or oligomeric compounds (C2) which are different from component (A) and have two acrylate and methacrylate groups per molecule. More particularly the esters of acrylic acid and/or methacrylic acid, preferably the esters of acrylic acid, with difunctional alcohols are used as component (C2).

Examples of suitable reactive diluents (C2) are butanediol diacrylate, hexanediol diacrylate, dipropylene glycol diacrylate, tripropylene glycol diacrylate, and mixtures of the stated difunctional reactive diluents. It is preferred to use hexanediol diacrylate as component (C2).

Use is made as reactive diluents (C3) of one or ore monomeric and/or oligomeric compounds (C3) which are different from component (A) and have 3 acrylate and/or methacrylate groups per molecule. In particular, the esters of acrylic and/or methacrylic acid, preferably the esters of acrylic acid, with trifunctional alcohols are used as component (C3).

Examples of suitable reactive diluents (C3) are trimethylolpropane triacrylate, propoxylated glyceryl triacrylate, propoxylated trimethylolpropane triacrylate, pentaerythrityl triacrylate, and mixtures of the stated trifunctional reactive diluents, with trimethylolpropane triacrylate being preferred.

The inventively employed coating composition preferably comprises as reactive diluent a mixture of one or more tetrafunctional reactive diluents (C1) and one or more difunctional reactive diluents (C2), more particularly a mixture of pentaerythrityl tetraacrylate and hexanediol diacrylate.

Very particular preference is given to using, in the method of the invention, coating compositions which comprise as component (A1) at least one aliphatic urethane acrylate (A1) based on the isocyanurate of hexamethylene diisocyanate, and as reactive diluents (C) a mixture of (C1) pentaerythrityl tetraacrylate and (C2) hexanediol diacrylate.

The Solvent (LM) Optionally Used

The coating compositions used in the method of the invention may optionally further comprise solvents. The solvents, though, must be selected such that, in the mixture of solvents employed—or, if they are used in unmixed form, they themselves—are very largely optically inert with regard to the polycarbonate substrate, and preferably do not detract from its transparency. "Inert" in this sense means that there is no discernible hazing to the eye. The term "inert", however, does not rule out the solvents being allowed to cause deliberate incipient swelling of the polycarbonate substrate, which can contribute to an improvement in the adhesion. A further function of the solvents, besides reducing the viscosity of the coating compositions, is to permit extremely uniform flow of the coating composition on the substrate.

Suitable solvents are, in particular, ethanol, isopropanol, n-butanol, ethyl acetate, butyl acetate, solvent naphtha, methyl ethyl ketone, 1-methoxyprop-2-yl acetate, acetone or tetrahydrofuran, where combinations of different solvents are preferred in particular. Particular preference is given to using combinations of the solvents ethanol, isopropanol, n-butanol, ethyl acetate, butyl acetate, methyl ethyl ketone, to and 1-methoxyprop-2-yl acetate.

Further Constituents of the Inventively Employed Coating Composition

The coating compositions used in the method of the invention may advantageously comprise photoinitiators (PI).

Suitable photoinitiators are, in particular, those from the group consisting of alpha-hydroxy ketones, alpha-amino ketones, phenylglyoxylates, benzyl dimethyl ketals, monoacylphosphines, bisacylphosphines, phosphine oxides, metallocenes, and iodonium salts. Preferred examples include 1-hydroxycyclohexyl phenyl ketone (Irgacure® 184), 2-hydroxy-2-methyl-1-phenyl-1-propanone (Irgacure® 1173), 2-hydroxy-1-{4-[4-(2-hydroxy-2-methylpropionyl)benzyl]phenyl}-2-methylpropan-1-one (Irgacure® 127), 2-hydroxy-1-[4-(2-hydroxyethoxy)phenyl]-2-methyl-1-propanone (Irgacure 2959), methyl benzoyl formal (Darocure® MBF), phosphine oxide, phenylbis(2,4,6-trimethylbenzoyl) (Irgacure® 819), and diphenyl-(2,4,6-trimethylbenzoyl)phosphine oxide (Lucirin® TPO).

In order to ensure particularly good flow of the coating and hence in order to obtain particularly smooth surfaces, commercial flow control agents such as Byk® 333, BYK® 310, for example, can be added to the coating composition employable in accordance with the invention. Additions of this kind lower the surface tension of the UV coating material, thus ensuring effective wetting of the substrate under appropriate application conditions. The coating compositions advantageously comprise flow control agents which contain one or more ethylenic double bonds, which are able, during the curing operation, to react with the ethylenic double bonds of the binder. An example of such a flow control agent, employed with preference, is Byk UV 3570.

If necessary it is possible to add adhesion promoters, which ensure the permanent intermediate adhesion to the substrate (polycarbonate, for example) and/or primer. Examples of this class of additive are chlorinated polyolefins, acidic polyesters or phosphoric acid adducts. The use of deaerating agents may also be necessary in order to avoid popping marks on the film surface. Suitability for this purpose is possessed by commercial deaerating agents such as Byk-A 500, Byk-A 50, Byk-A 515, BYK 390, BYK 306, BYK 315, and BYK 356, for example.

The coating compositions employed in the method of the invention may, in addition to the constituents identified above, also comprise further additives typical for clearcoat materials, such as wetting agents, for example.

If necessary, the inventively employed coating compositions may comprise—as further additives typical for clearcoat materials—one or more light stabilizers. Suitability is possessed by the commonly employed light stabilizers, especially those based on UV absorbers and/or sterically hindered amines (HALS). The inventively employed coating compositions preferably contain less than 6%, more particularly less than 0.1%, by weight, based in each case on the total weight of components (A1), (A2), (A3), (B), (C1), (C2), and (C3), of light stabilizers. With very particular preference they contain no light stabilizer at all.

The components (A), (B), and (PI) and also the additives typical for clearcoat materials may be added in dissolved or dispersed form to the coating composition employed in the method of the invention. The solvents and/or reactive diluents of these components that are used for such dissolution or dispersion are assigned to the reactive diluent (C) or to the solvent, with regard to the complete coating composition. In other words, constituent (C) also includes the reactive diluents which enter the coating composition by way of the other components.

The coating compositions employed in accordance with the invention preferably comprise (i) 30% to 60% by weight, preferably more than 40% to 50% by weight, based on the total weight of components (A1), (A2), (A3), (B), (C1), (C2), and (C3), of the nanoparticles (B), (ii) 15% to 40% by weight, preferably 20% to 30% by weight, based on the total weight of film-forming components (A1), (A2), (A3), (C1), (C2), and (C3), of one or more urethane (meth)acrylates (A1) having on average 3 to 5 acrylate and/or methacrylate groups per molecule, (iii) 0% to less than 10% by weight, preferably 0% to 5% by weight, based on the total weight of film-forming components (A1), (A2), (A3), (C1), (C2), and (C3), of one or more urethane (meth)acrylates (A2) having on average more than 5 acrylate and/or methacrylate groups per molecule, (iv) 0% to less than 10% by weight, preferably 0% to 5% by weight, based on the total weight of film-forming components (A1), (A2), (A3), (C1), (C2), and (C3), of one or more urethane (meth)acrylates (A3) having on average less than 3 acrylate and/or methacrylate groups per molecule, (v) 55% to 80% by weight, preferably 65% to 77% by weight, based on the total weight of film-forming components (A1), (A2), (A3), (C1), (C2), and (C3), of one or more monomeric and/or oligomeric compounds (C1), different from components (A1), (A2), and (A3), and having 4 acrylate and/or methacrylate groups per molecule, (vi) 0% to 15% by weight, preferably 3% to 10% by weight, based on the total weight of film-forming components (A1), (A2), (A3), (C1), (C2), and (C3), of one or more monomeric and/or oligomeric compounds (C2), different from components (A1), (A2), and (A3), and having 2 acrylate and/or methacrylate groups per molecule, and (vii) 0% to 15% by weight, preferably 0% to 10% by weight, based on the total weight of film-forming components (A1), (A2), (A3), (C1), (C2), and (C3), of one or more monomeric and/or oligomeric compounds (C3), different from components (A1), (A2), and (A3), and having 3 acrylate and/or methacrylate groups per molecule, the sum of the weight fractions of film-forming components (A1), (A2), (A3), (C1), (C2), and (C3) being in each case 100% by weight.

If solvents are present they may be included in an amount of up to 80% by weight, based on the overall coating composition.

Finally the coating composition contains preferably 0% to 10%, more preferably 1% to 6%, and very preferably 2% to 4% by weight of one or more photoinitiators (PI), the amounts being based on the total weight of the binder (A) plus the weight of reactive diluent (C) used, and 0% to 15%, more preferably 0.5% to 10%, and very preferably 0.5% to 5% by weight of further additives typical of clearcoat materials, the amounts being based on the total weight of the coating composition.

Plastics Substrate

By a polycarbonate or polycarbonate substrate is meant, in the present invention, not only homopolycarbonates but also copolycarbonates. In a known way the polycarbonates can be linear or branched. It is also possible for some of the carbonate groups of the homo- or copolycarbonates to have been replaced by dicarboxylic ester groups or other polycarbonate-compatible groups. Preferred among the dicarboxylic ester groups are aromatic dicarboxylic ester groups. Where the polycarbonates include dicarboxylic acid radicals as well as carbonic acid radicals, they are also referred to as polyester carbonates, which, as maintained above, are likewise covered by the term "polycarbonates". Where dicarboxylic ester groups are present, they may be included in a fraction of up to 80 mol %, preferably 20 to 50 mol %.

Polycarbonates can be produced by any of the processes known from the literature. Suitable processes for producing polycarbonates are, for example, their production from bisphenols with phosgene by the phase interface process, or the process from a homogeneous phase (pyridine process), or from bisphenols with carbonic esters by the melt transesterification process. These production processes are for example described in H. Schnell, "Chemistry and Physics of Polycarbonates", Polymer Reviews, Volume 9, pp. 31 to 76, Interscience Publishers, New York, London, Sydney, 1964. The stated production processes are also described in D. Freitag, U. Grigo, P. R. Müller, H. Nouvertne, "Polycarbonates" in Encyclopedia of Polymer Science and Engineering, Volume 11, Second Edition, 1988, pages 648 to 718, and in U. Grigo, K. Kircher and P. R. Müller "Polycarbonate" in Becker, Braun, Kunststoff-Handbuch, Volume 3/1, Polycarbonate, Polyacetale, Polyester, Celluloseester, Carl Hanser Verlag Munich, Vienna 1992, pages 117 to 299. The melt transesterification process is more particularly described in H. Schnell, "Chemistry and Physics of Polycarbonates", Polymer Reviews, Volume 9, pp. 44 to 51, Interscience Publishers, New York, London, Sydney, 1964, and also in DE 10 31 512 A, U.S. Pat. No. 3,022,272, U.S. Pat. No. 5,340,905, and U.S. Pat. No. 5,399,659. The polycarbonates produced by the processes described above possess a weight-average molecular weight Mw of preferably 12 000 to 400 000 g/mol, more preferably of 18 000 to 80 000 g/mol, and very preferably of 22 000 to 60 000 g/mol.

The plastics substrates may also be composed of polymethyl methacrylate (PMMA).

Particular preference is given to transparent polycarbonates and polycarbonate substrates, preferably those with a transmittance of >80% for visible light.

The plastics substrates can be present in any desired three-dimensional form. The method of the invention is suitable more particularly for the coating of casings of electronic components, such as, for example, of cell phone shells, smartphones, iPhones, electronic organizers, MP3 players, iPods, laptops, computers, digital cameras, video cameras, games consoles, Gameboys, and the like.

Application and Curing of the Coating Composition, and Coated Plastics Substrates Application to the substrate takes place by standard coating methods such as dipping, flow-coating, injecting, brushing, knife coating, rolling, spraying, falling-film application, spin coating or spinning, for example. Particularly advantageous is the application of the coating compositions in a dipping or flow-coating operation and also by spray application with a low coat thickness and good flow.

For this purpose the plastics substrate may be pretreated with a primer before the coating composition is applied. Examples of suitable primers include compositions like those used in the method of the invention but without any nanoparticles (B) included. Preferably the method of the invention takes place without primer treatment of the substrate. With particular preference the method of the invention takes place in a one-coat process, in other words by application of just one coat of the coating composition directly to the plastics substrate without chemical pretreatment.

After the coating has been applied, the substrate has been allowed to drip-dry, where appropriate, and the coating has then been flashed off, in ways which are known to the skilled worker, the coating is cured. Curing may take place by exposure to high-energy radiation, such as UV radiation or electron beams, for example. Radiation sources used are preferably low-pressure mercury lamps, medium-pressure lamps, high-pressure lamps, and fluorescent tubes, pulsed emitters or excimer emitters, which preferably emit light in a wavelength range between $\lambda=200$ to 700 nm, more preferably $\lambda=200$ to 500 nm, and very preferably $\lambda=200$ to 400 nm. Preference is given, moreover, to lamp or emitter systems which, through modification of the reflector, impose a low thermal load on the substrate. Lamp systems of this kind are known in the form of URS reflector systems from IST Metz GmbH. The radiation dose typically sufficient for UV curing is situated between 100 to 6000 mJ/cm$^2$, more preferably 1000 to 4000 mJ/cm$^2$, and very preferably 12000 to 3000 mJ/cm$^2$. Depending on the distance between substrate and UV lamp, lamp output, and reflector system, UV irradiation intensities of between 100 to 6000 mW/cm$^2$, preferably 1000 to 4000 mW/cm$^2$ and with special preference 2000 to 3000 mW/cm$^2$, are employed.

Irradiation may be carried out under an oxygen-depleted atmosphere. "Oxygen-depleted" means that the oxygen content of the atmosphere is less than the oxygen content of air (20.95% by weight). The atmosphere may in principle also be oxygen-free, in that case being composed of an inert gas. Suitable inert gases are carbon dioxide, nitrogen, noble gases or combustion gases. A preferred range for UV curing in an oxygen-depleted atmosphere is between 0.1% to 5% by weight of residual oxygen. Irradiation of the coating material may also take place beneath transparent media such as polymeric films, glass or liquids. Irradiation under an oxygen-depleted atmosphere has beneficial consequences in particular for the subsequent hardness and chemical resistance of the cured coating.

Following curing, coating and substrate are transparent. The coating obtained on the substrate has a haze value after curing and before exposure of less than 1, preferably less than 0.8, in each case as determined using the BYK-Gardner Haze-gard plus C4725 instrument.

Following scratch exposure, measured with the Taber test in a method based on ASTM 1044-05 and ASTM 1003-00, the exposed coating has a haze value of ≤15%, preferably ≤10%, more preferably ≤8%, determined in each case using the BYK-Gardner Haze-gard plus C4725 instrument.

Further provided by the invention are coated plastics substrates, especially casings of electronic appliances, that are obtainable by the method of the invention. These may be, for example, cell phone cases, smartphones, iPhones, electronic organizers, MP3 players, iPods, laptops, computers, digital cameras, video cameras, games consoles, Gameboys, and the like.

The invention is elucidated in more detail below with reference to examples.

Example 1

Production of an Inventive Coating B1

In a brown glass jar, 5.0 g of n-butanol, 16.81 g of isopropanol, and 8.2 g of ethanol are mixed. Then 1.4 g of Irgacure® 184 (commercial photoinitiator from Ciba Speciality Chemicals; 1-hydroxycyclohexyl phenyl ketone) are added with stirring. Likewise with stirring, 8.5 g of Desmolux® VP LS 2308 (unsaturated, aliphatic, substantially isocyanate-group-free polyurethane acrylate based on the isocyanurate of hexamethylene diisocyanate and hydroxyethyl acrylate, having a hydroxyl content of about 0.5% according to DIN 53 240/2 and an average acrylate group content of 3 to 4 acrylate groups per molecule, from Bayer Material Science AG, approximately 80% in hexanediol diacrylate (HDDA), density 1.11 g/cm$^3$), 19.7 g of SR 295 (pentaerythrityl tetraacrylate from Sartomer), 0.4 g of Byk UV 3570 (commercial flow control additive from Byk-Chemie GmbH, solution of a polyester-modified acrylo-functional polydimethylsiloxane), and 40.0 g of Nanopol® C 784 (commercial SiO$_2$, average particle diameter 20 nm, 50% strength in butyl acetate, available from Nano Resins AG) are added. After 15 minutes, the composition is applied to a polycarbonate panel, using a 36 μm doctor rod. The panel is placed in the oven at 80° C. for 5 minutes to flash off, and then is cured using UV light in an IST Lignocure unit equipped with two UV lamps (mercury lamps), both set to 100% power output. The coated polycarbonate panel is cured with a dose of 2500 to 3000 mJ/cm$^2$.

Further Modes of Application

In the case of application by immersion, it is preferred to set a solids content of 50% by weight. The solvent combination used is preferably a mixture of n-butanol, ethanol, ethyl acetate, isopropanol, and solvent naphtha. After an immersion time of, for example, 5 seconds, a drip-dry time of around 1 minute, and a flash-off time of approximately 5 minutes at around 80° C., curing is carried out using an IST Lignocure unit (dose 1.8 J/cm$^2$, intensity 0.3 W/cm$^2$) to give coatings with a coat film thickness of 9 to 14 μm.

In the case of application by flow coating, it is preferred to set a solids content of 50% by weight. The solvent combination used is preferably a mixture of n-butanol, ethanol, ethyl acetate, isopropanol, and solvent naphtha. After a drip-dry time of around 1 minute, and a flash-off time of approximately 5 minutes at around 80° C., curing is carried out using an IST Lignocure unit (dose 1.8 J/cm$^2$, intensity 0.3 W/cm$^2$) to give coatings with a coat film thickness of 9 to 12 μm.

In the case of application by spraying (nozzle: 1.3 mm, air pressure 4 bar, spraying distance 20 cm), it is preferred to set a solids content of 40% by weight. The solvent combination used is preferably a mixture of ethyl acetate, butyl acetate, and isopropanol. After a flash-off time of approximately 5 minutes at around 80° C., curing is carried out using an IST Lignocure unit (dose 3.9 J/cm$^2$, intensity 1.4 W/cm$^2$) to give coatings with a coat film thickness of about 7 μm.

Measurement of the Haze:

The transparency is measured in accordance with test standard ASTM D1003. The initial haze value before exposure is shown in table 1.

Test of the Adhesion:

The adhesion is tested as follows on the coating from example 1:

Adhesion test using tape pull-off (ASTM D 3359 and ISO 2409)

Boil test: A bath filled with demineralized water is brought to the boil. The treated substrates are then immersed in the boiling water for 4 hours. After 4 hours, they are removed from the water and briefly set aside to cool. Then a cross hatch is scored in the panel, and the adhesion with tape (Tesa pull-off) is tested. A coating passing the adhesion test (i.e., GT<2) can be entered into the water storage test (water storage as per ASTM 870-02 and ISO 2812-2).

Test of the Abrasion Resistance:

The abrasion resistance of the surfaces was investigated using the Taber test. The Taber test and the subsequent haze measurement were carried out along the lines of ASTM D 1044-05 and ASTM D 1003-00, the samples having not been stored under standard conditions at 23° C. and 50% relative humidity prior to measurement. The haze after Taber is tested after 100, 300, and 1000 revolutions. The values are shown in table 1.

TABLE 1

Test results for the coating from example 1

| Initial haze [%] | Δ haze [%] after 100 revs | Δ haze [%] after 300 revs | Δ haze [%] after 1000 revs | Adhesion GT | Boil test GT |
|---|---|---|---|---|---|
| 0.57 | 2.45 | 3.49 | 4.24 | 0 | 0 |

Impact Test

The resistance of the coating compositions under impact deformation (impact test) was examined in a procedure along the lines of the standard DIN EN ISO 6272-1 DE. Testing takes place using a weight (300 g; indenter 3/16) falling from a defined height (15 cm, 25 cm, 50 cm). The damage was assessed visually:

Moving out from the point of impact concentric cracks can be seen in the coating, which increase and extend further as the drop height goes up. In all three cases, the substrate itself shows no damage, and there is no discernible detachment of the coating; in other words, the adhesion between substrate and coating continues to be ensured.

What is claimed is:

1. A method of coating a plastic substrates comprising applying a transparent coating composition to the plastic substrate, the transparent coating composition comprising at least one radiation-curable urethane (meth)acrylate (A), nanoparticles (B), reactive diluents (C), and, optionally, solvents to the plastics substrate, said the transparent coating composition further comprising
    (i) 30% to 60% by weight, based on the total weight of components (A1), (A2), (A3), (B), (C1), (C2), and (C3), of nanoparticles (B),
    (ii) 15% to 40% by weight, based on the total weight of film-forming components (A1), (A2), (A3), (C1), (C2), and (C3), of one or more urethane (meth)acrylates (A1) having on average 3 to 5 acrylate and/or methacrylate groups per molecule,
    (iii) 0% to less than 10% by weight, based on the total weight of film-forming components (A1), (A2), (A3), (C1), (C2), and (C3), of one or more urethane (meth) acrylates (A2) having on average more than 5 acrylate and/or methacrylate groups per molecule,
    (iv) 0% to less than 10% by weight, based on the total weight of film-forming components (A1), (A2), (A3), (C1), (C2), and (C3), of one or more urethane (meth) acrylates (A3) having on average less than 3 acrylate and/or methacrylate groups per molecule,
    (v) 55% to 80% by weight, based on the total weight of film-forming components (A1), (A2), (A3), (C1), (C2), and (C3), of one or more monomeric and/or oligomeric compounds (C1), different from components (A1), (A2), and (A3), and having 4 acrylate and/or methacrylate groups per molecule,
    (vi) 0% to 15% by weight, based on the total weight of film-forming components (A1), (A2), (A3), (C1), (C2), and (C3), of one or more monomeric and/or oligomeric compounds (C2), different from components (A1), (A2), and (A3), and having 2 acrylate and/or methacrylate groups per molecule,
    (vii) 0% to 15% by weight, based on the total weight of film-forming components (A1), (A2), (A3), (C1), (C2), and (C3), of one or more monomeric and/or oligomeric compounds (C3), different from components (A1), (A2), and (A3), and having 3 acrylate and/or methacrylate groups per molecule,
    the sum of the weight fractions of film-forming components (A1), (A2), (A3), (C1), (C2), and (C3) being 100% by weight, wherein components (A1), (A2) and (A3) are weight fractions of the at least one radiation-curable urethane (meth)acrylate) (A) and components (C1), (C2), and (C3) are weight fractions of the reactive diluents (C).

2. The method of claim 1, wherein the transparent coating composition is applied to a plastic substrate selected from the group consisting of polycarbonate, blends of polycarbonate with other plastics, blends of polycarbonate and polymethyl methacrylate (PMMA), or polymethyl methacrylate (PMMA).

3. The method of claim 1, wherein the transparent coating composition is applied to a plastic substrate comprising at least one surface of an electronic appliance casing.

4. The method of claim 1, wherein the transparent coating composition comprises
    (i) more than 40% to 50% by weight, based on the total weight of components (A1), (A2), (A3), (B), (C1), (C2), and (C3), of the nanoparticles (B),
    (ii) 20% to 30% by weight, based on the total weight of film-forming components (A1), (A2), (A3), (C1), (C2), and (C3), of one or more urethane (meth)acrylates (A1) having on average 3 to 5 acrylate and/or methacrylate groups per molecule,
    (iii) 0% to 5% by weight, based on the total weight of film-forming components (A1), (A2), (A3), (C1), (C2), and (C3), of one or more urethane (meth)acrylates (A2) having on average more than 5 acrylate and/or methacrylate groups per molecule,
    (iv) 0% to 5% by weight, based on the total weight of film-forming components (A1), (A2), (A3), (C1), (C2), and (C3), of one or more urethane (meth)acrylates (A3) having on average less than 3 acrylate and/or methacrylate groups per molecule,
    (v) 65% to 77% by weight, based on the total weight of film-forming components (A1), (A2), (A3), (C1), (C2), and (C3), of one or more monomeric and/or oligomeric compounds (C1), different from components (A1), (A2), and (A3), and having 4 acrylate and/or methacrylate groups per molecule,
    (vi) 3% to 10% by weight, based on the total weight of film-forming components (A1), (A2), (A3), (C1), (C2), and (C3), of one or more monomeric and/or oligomeric compounds (C2), different from components (A1), (A2), and (A3), and having 2 acrylate and/or methacrylate groups per molecule, and (vii) 0% to 10% by weight, based on the total weight of film-forming components (A1), (A2), (A3), (C1), (C2), and (C3), of one or more monomeric and/or oligomeric compounds (C3), different from components (A1), (A2), and (A3), and having 3 acrylate and/or methacrylate groups per molecule, the sum of the weight fractions of film-forming components (A1), (A2), (A3), (C1), (C2), and (C3) being 100% by weight.

5. The method of claim 1, wherein the transparent coating composition further comprises less than 6% by weight, based on the total weight of components (A1), (A2), (A3), (B), (C1), (C2), and (C3), of light stabilizers.

6. The method of claim 1, wherein the transparent coating composition comprises as component (C1) at least one of pentaerythrityl tetraacrylate, ditrimethylolpropane tetraacrylate, and mixtures thereof.

7. The method of claim 1, wherein the coating composition comprises as component (C2) hexanediol diacrylate.

8. The method of claim 1, wherein the transparent coating composition comprises as component (A1) one or more urethane (meth)acrylates (A1) having on average 3 to 4 acrylate and/or methacrylate groups per molecule.

9. The method of claim 8, wherein the transparent coating composition comprises as component (A1) one or more aliphatic urethane acrylates (A1).

10. The method of claim 9, wherein the transparent coating composition comprises as component (A1) one or more aliphatic urethane acrylates (A1) based on an isocyanurate of hexamethylene diisocyanate.

11. The method of claim 10, wherein the transparent coating composition comprises as component (A1) one or more aliphatic urethane acrylates (A1) based on the isocyanurate of hexamethylene diisocyanate, and as reactive diluents (C) a mixture of (C1) pentaerythrityl tetraacrylate and (C2) hexanediol diacrylate.

12. The method of claim 1, wherein the transparent coating composition is applied directly to the plastic substrate.

13. A coated plastic substrate made by the method of claim 1.

14. The coated plastic substrate of claim 13, that is an electronic appliance casing.

15. A coated electronic appliance casing as claimed in claim 14, the appliance being a member selected from the group consisting of cell phone shells, smartphones, cell phones, electronic organizers, digital music recorders and players, laptops, computers, digital cameras, video cameras, games consoles and information recording and retaining devices.

* * * * *